(12) United States Patent
Chun et al.

(10) Patent No.: US 11,714,185 B2
(45) Date of Patent: Aug. 1, 2023

(54) SENSOR-CLUSTER APPARATUS

(71) Applicant: HYUNDAI MOBIS Co., Ltd., Seoul (KR)

(72) Inventors: Jun Su Chun, Yongin-si (KR); Hee Chang Roh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/713,244

(22) Filed: Apr. 5, 2022

(65) Prior Publication Data

US 2022/0229170 A1 Jul. 21, 2022

Related U.S. Application Data

(63) Continuation of application No. 16/724,345, filed on Dec. 22, 2019, now Pat. No. 11,333,751.

(30) Foreign Application Priority Data

Oct. 25, 2019 (KR) ......................... 10-2019-0134012

(51) Int. Cl.
  *G01S 13/86* (2006.01)
  *G01S 13/931* (2020.01)
  *G01S 7/02* (2006.01)

(52) U.S. Cl.
  CPC ............ *G01S 13/86* (2013.01); *G01S 13/865* (2013.01); *G01S 13/867* (2013.01); *G01S 13/931* (2013.01); *G01S 7/027* (2021.05)

(58) Field of Classification Search
  None
  See application file for complete search history.

(56) References Cited

U.S. PATENT DOCUMENTS

| | | | |
|---|---|---|---|
| 2,378,856 A * | 6/1945 | Laddon | ................. B64C 1/1415 |
| | | | 160/209 |
| 3,924,826 A | 12/1975 | Reinert | |
| 4,887,779 A | 12/1989 | Large | |
| 4,911,219 A * | 3/1990 | Dalrymple | ........... B61D 19/003 |
| | | | 160/202 |
| 5,765,043 A | 6/1998 | Tyler | |
| 6,533,218 B1 | 3/2003 | Jahn | |
| 7,387,276 B1 | 6/2008 | Smith et al. | |

(Continued)

OTHER PUBLICATIONS

Entry for the word, "window"; "Webster's New World College Dictionary"; editor M. Agnes; fourth edition; p. 1640; Wiley Publishing, Inc.; Cleveland, Ohio, USA; copyright in the year 2007; ISBN 0-02-863119-6. (Year: 2007).*

(Continued)

*Primary Examiner* — Bernarr E Gregory
(74) *Attorney, Agent, or Firm* — H.C. Park & Associates, PLC

(57) ABSTRACT

A sensor-cluster apparatus, in which a sensor configured to detect and collect external environment information is mounted in a case. The sensor-cluster apparatus includes a body member on which one kind or more of sensors are mounted on one surface thereof, a case in which an inner space is provided, and one surface thereof is opened to define an opening and on which the body member is mounted so that each of the sensors is exposed to the opening, and a position control device mounted inside the case to adjust a mounting position or a mounting angle of the body member.

12 Claims, 9 Drawing Sheets

(56) References Cited

U.S. PATENT DOCUMENTS

| | | | |
|---|---|---|---|
| 9,540,092 B2 | 1/2017 | Miller | |
| 11,333,751 B2* | 5/2022 | Chun | G01S 13/865 |
| 2016/0348770 A1* | 12/2016 | Kuo | G01S 13/931 |
| 2019/0079532 A1* | 3/2019 | Crawley | G01S 7/4808 |

OTHER PUBLICATIONS

Non-Final Office Action dated Sep. 14, 2021, issued to U.S. Appl. No. 16/724,345.
Notice of Allowance dated Jan. 26, 2022, issued to U.S. Appl. No. 16/724,345.

\* cited by examiner

SENSOR-CLUSTER APPARATUS

CROSS-REFERENCE TO RELATED APPLICATIONS

This application is a continuation of U.S. patent application Ser. No. 16/724,345, filed on Dec. 22, 2019, now U.S. Pat. No. 11,333,751, which claims priority and benefit of Korean Patent Application No. 10-2019-0134012, filed on Oct. 25, 2019, which is hereby incorporated by reference for all purposes as if set forth herein.

BACKGROUND

Field

Exemplary embodiments relate to a sensor-cluster apparatus capable of being applied to an advanced driver assistance system (ADAS), and more particularly, to a sensor-cluster apparatus that is capable of calibrating a sensor position and/or a sensor arrangement angle to correct twisting or position changing of sensors when the misalignment or position changing of the sensors is detected by a controller for controlling the sensors or monitoring sensor's functions.

Discussion of the Background

With the development of technology, autonomous vehicles are rapidly being developed in the vehicle fields for the convenience of living. "Autonomous vehicle" refers to a vehicle which can be driven by itself without any operation by its driver or passengers and various technologies are being developed to enable autonomous driving.

In particular, studies of an advanced driver assistance system (ADAS) are underway to complete autonomous driving technology.

The ADAS refers to a technology in which the vehicle itself recognizes some (or all) of a number of situations that may occur while driving and determines the recognized situations to control steering, braking, and acceleration/deceleration of the vehicle.

The ADAS is a system that encompasses several systems, such as, for example, an autonomous emergency braking (AEB) system by which the vehicle is decelerated or stopped by itself without the driver applying the brakes, a lane-keep assist system (LKAS) that automatically adjusts steering when the vehicle leaves the lane, and an around-view monitor (AVM) system that visually displays the information of the vehicle surroundings, and the like.

Thus, the ADAS essentially requires sensors that are capable of detecting and grasping the environment surrounding the vehicle.

The sensors are provided with sensors for recognizing a position of the vehicle and sensors for sensing the driving environment. An inertial measurement unit (IMU), a global positioning system (GPS), and the like are used as the sensors for recognizing the position of the vehicle. Also, a camera sensor, a lidar sensor, a radar sensor, and the like are used for detecting objects and the driving environments.

The sensors may be installed in a front bumper, a radiator grill, the vicinity of a headlight, a top surface of a roof panel, a trunk lid, etc., of the vehicle, respectively, as illustrated in FIG. 1, which illustrates positions of the sensors mounted on the vehicle in accordance with the related art.

However, the sensors have a problem in that the sensing function is limited depending on the external environments. For example, the camera sensor may be difficult to acquire valid data under a dark environment with no lighting or under severe weather, and the radar sensor may be deteriorated in reliability when radio waves are scattered in accordance with the environment and weather.

Therefore, there is a need for heterogeneous sensors to complement data from each other in accordance with the surrounding environments. That is, integration and convergence of different types of sensors have been required.

In order to realize the integration and convergence of such sensors, although software that controls the sensors and acquires the data is important, the necessity for physically collecting and arranging the sensors is required.

The above information disclosed in this Background section is only for enhancement of understanding of the background of the invention and, therefore, it may contain information that does not constitute prior art.

SUMMARY

Exemplary embodiments of the present invention provide a sensor-cluster apparatus that is capable of collecting and arranging heterogeneous sensors and capable of adjusting and correcting positions and arrangement angles of the sensors.

Additional features of the invention will be set forth in the description which follows, and in part will be apparent from the description, or may be learned by practice of the invention.

An exemplary embodiment of the present invention provides a sensor-cluster apparatus in which a sensor configured to detect and collect external environment information is mounted in a case. The sensor-cluster apparatus includes: a body member on which one kind or more of sensors are mounted on one surface thereof; a case in which an inner space is provided, and one surface thereof is opened to define an opening and on which the body member is mounted so that each of the sensors is exposed to the opening; and a position control device mounted inside the case to adjust a mounting position or a mounting angle of the body member.

The position control device may include: a ball joint in which a ball stud having a ball at an end thereof and a casing stud having a casing, which accommodates the ball and allows the ball stud to be freely rotated, at an end thereof are coupled to each other; a tension spring having one end connected to the case and the other end connected to the body member to provide elastic force that resists a tensile load; and an actuator configured to press the body member within the case.

One of the ball stud and the casing stud may be fixed to the body member, and the other may be fixed to the case, and a mounting position and a mounting angle of the body member may be maintained by the tension spring. When the actuator presses the body member, the actuator may overcome the elastic force of the tension spring, and the mounting position and the mounting angle of the body member are changed. That is, the mounting position and angle may be calibrated.

The ball joint, the tension spring, and the actuator may be mounted on a surface of the body member, which is opposite to the surface on which the sensors are mounted. However, a portion of the ball joint, the tension spring, and the actuator may be mounted on the surface on which the sensors are mounted, with a range in which an interference with each of the sensors does not occur.

The actuator may operate through a hydraulic device, a pneumatic device, or another power supply device. However, in the present invention, the actuator may operate by driving an electromagnet or a motor through the supply of current so as to enable precise position control.

The actuator may include: a cylinder having a hollow cylindrical shape; and a piston slidably mounted inside the cylinder and disposed so that an end of the piston presses the body member. The piston may be configured to slide through the device, such as the motor or the electromagnet, which is rotatable forward and reverse.

The ball joint, the tension spring, and the actuator may form one adjustment set, and at least two or more adjustment sets may be installed at positions that are spaced apart from each other, respectively.

The body member may have a rectangular plate shape having four vertices, and the adjustment set may be disposed in the vicinity of two vertices which are diagonally connected to each other in the body member, respectively.

The ball joint and the tension spring may be additionally installed in the body member and the case in addition to the ball joint and the tension spring, which are provided in the adjustment set, respectively.

The ball joint and the tension spring that are additionally installed in addition to the ball joint and the tension spring, which are provided in the adjustment set, may be installed in the vicinity of one of remaining two vertices except for the two vertices at which the adjustment set is disposed in the body member.

The sensors may include: a camera sensor disposed within the case to face the opening, the camera sensor being configured to recognize an object in a visible light wavelength region; an infrared sensor disposed within the case to face the opening, the infrared sensor being configured to recognize an object in an infrared light wavelength region; a lidar sensor disposed within the case to face the opening, the lidar sensor being configured to emit an optical pulse and detect an object through a reflected carrier signal, thereby mapping a distance; and a radar sensor disposed within the case to face the opening, the radar sensor being configured to emit electromagnetic waves and detect an object through a reflected carrier signal, thereby mapping a distance.

One radar sensor, one camera sensor, two infrared sensors, and two lidar sensors may be mounted on the body member. The radar sensor and the camera sensor may be disposed at a center of the body member, wherein the camera sensor may be disposed above the radar sensor, and the lidar sensors and the infrared sensors may be respectively disposed at both sides of the body member with the camera sensor and the radar sensor therebetween, wherein the infrared sensors may be disposed above the lidar sensors.

The radar sensor having a relatively narrow elevation angle (a sensible angle in a height direction of the vehicle) and a relatively wide azimuth angle (a sensible angle in a width direction of the vehicle) may be disposed below the center, and the camera sensor may be disposed above (above the center) the radar sensor. The lidar sensors may be disposed at both sides of the radar sensor, respectively, and the infrared sensors may be disposed at both sides of the camera sensor, respectively.

Since each of the lidar sensors has a relatively wide elevation angle and a relatively narrow azimuth angle when compared to those of the radar sensor, the two lidar sensors may be provided. Also, each of the infrared sensors may have a relatively wide elevation angle like the camera sensor, but the two infrared sensors may be provided in consideration of a space and symmetry.

Each of the infrared sensor, the camera sensor, the lidar sensor, and the radar sensor may be detachably coupled to the body member. That is, when one sensor needs to be replaced, only the corresponding sensor may be detached from the body member without detaching the body member from the case.

The sensor-cluster apparatus may further include a cover coupled to the case to cover the opening. The cover may prevent water, dust, and other foreign matter from being permeated into the case, wherein the cover may be made of a material through which infrared rays, visible light, optical pulses, and electromagnetic waves are transmittable.

The cover may open and close the opening by a sliding device, and the sliding device may include: a motor configured to axially rotate a rotation shaft; a gear assembly configured to convert rotation movement of the rotation shaft into sliding movement; and a slidable part coupled to the cover so as to be slid by the gear assembly.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
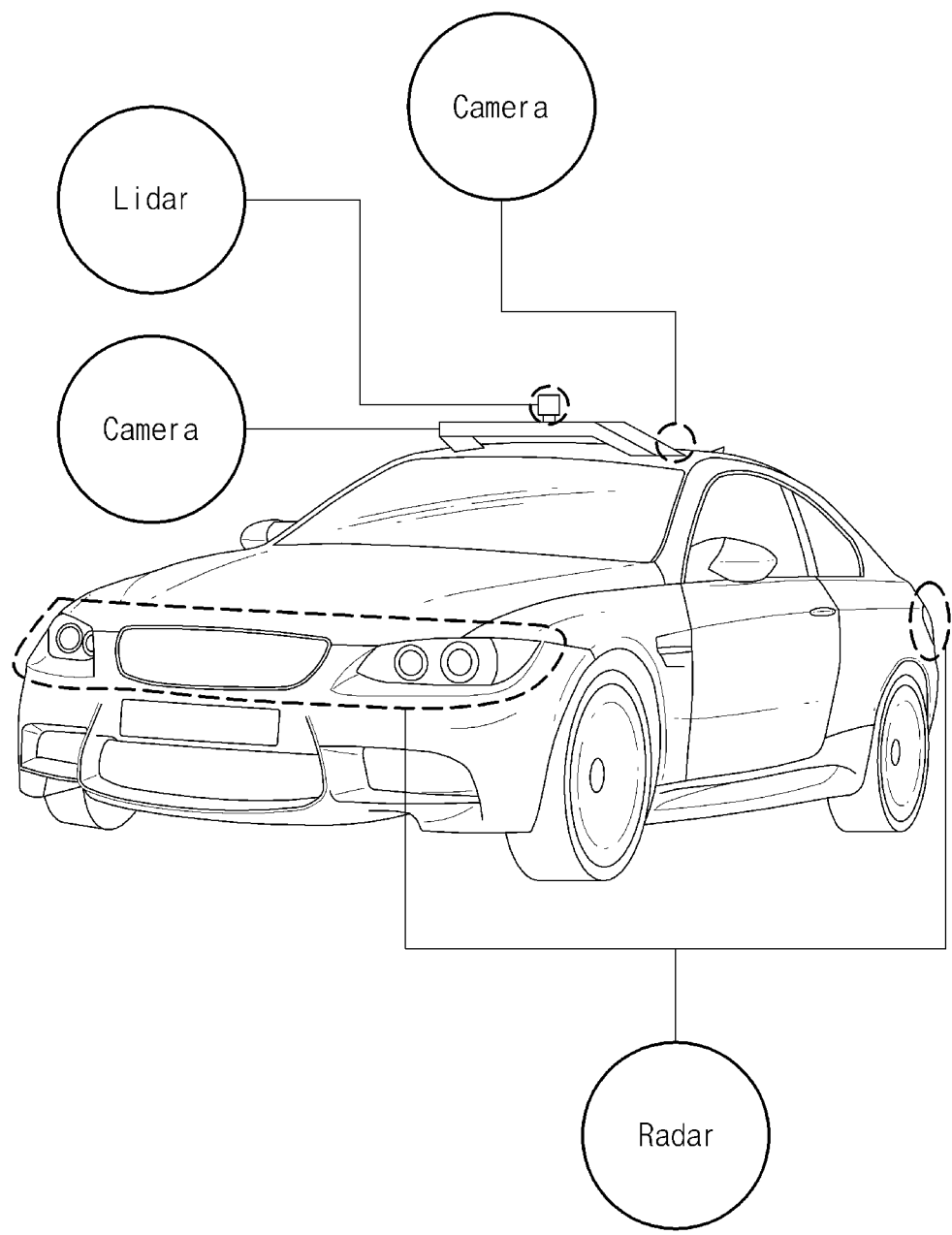
FIG. 1 is a view illustrating positions of sensors to be mounted on a vehicle in accordance to a related art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a sensor-cluster apparatus that is capable of being mounted on an autonomous vehicle. Hereinafter, preferred embodiments of the present invention will be described in more detail with reference to the accompanying drawings.

Figure 2:
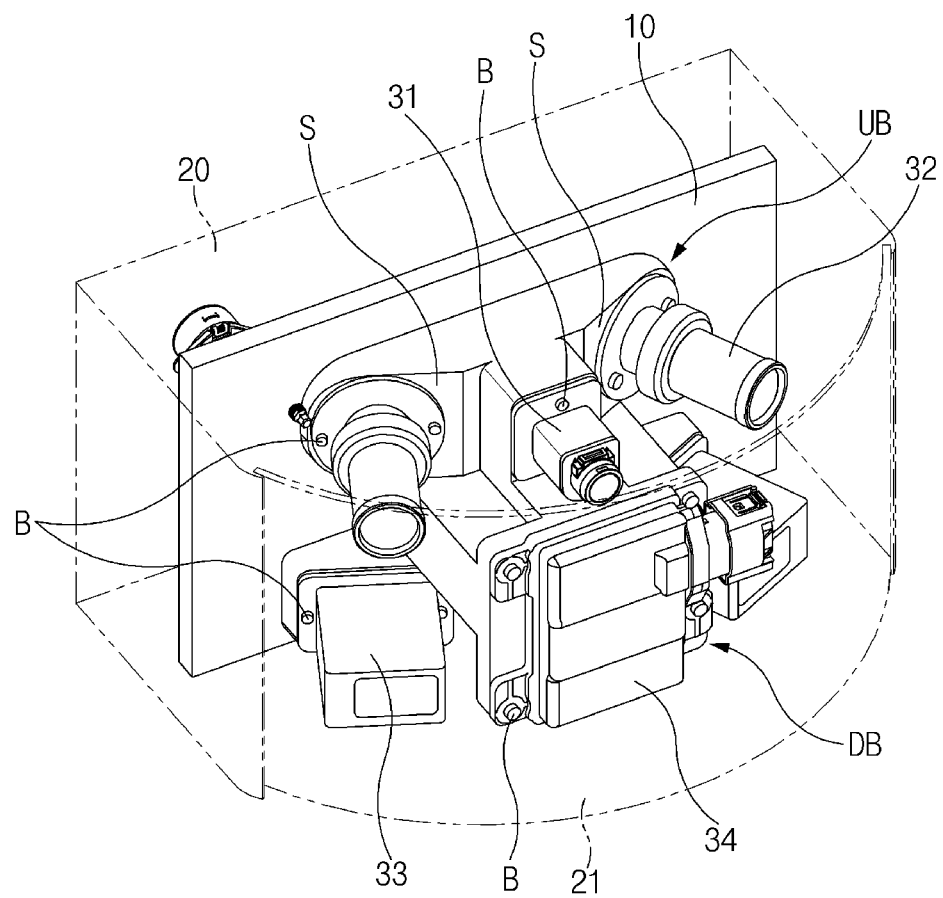
FIG. 2 is a perspective view illustrating the inside of a sensor-cluster apparatus in accordance with an exemplary embodiment of the present invention.
Figure 3:
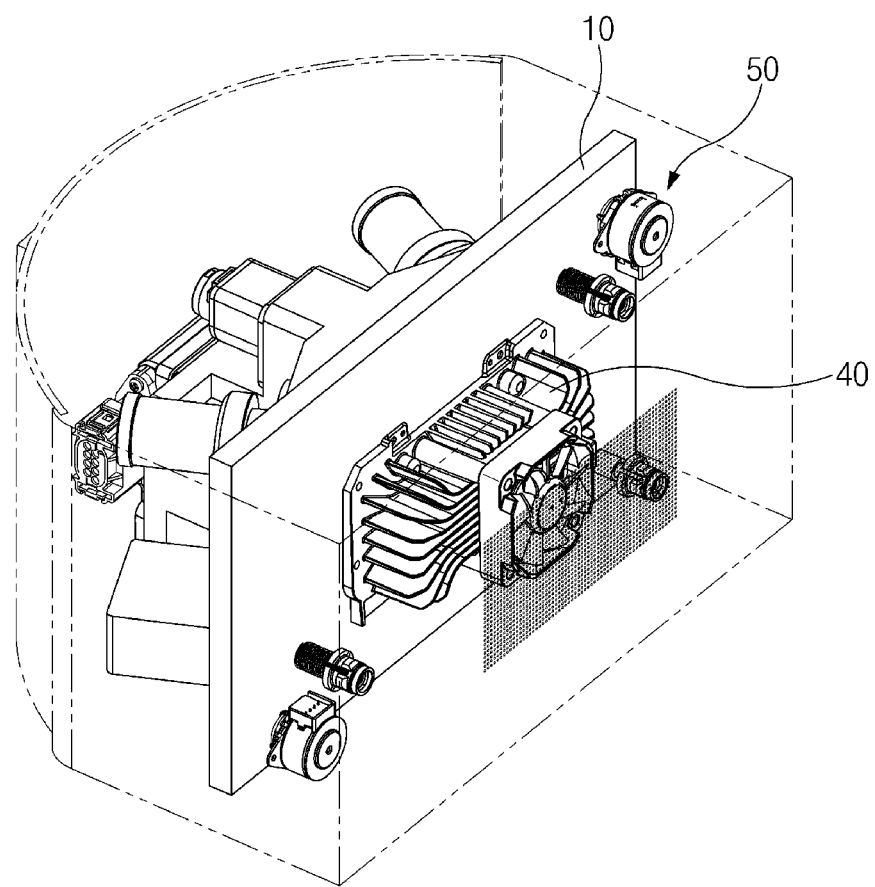
FIG. 3 is a perspective view illustrating a rear side of the sensor-cluster apparatus of FIG. 2.

FIG. 2 is a perspective view illustrating the inside of a sensor-cluster apparatus in accordance with the present invention, and FIG. 3 is a perspective view illustrating a rear side of the sensor-cluster apparatus of FIG. 2.

Referring to FIGS. 2 and 3, the sensor-cluster apparatus in accordance with the present invention includes a body member 10 on which one or more kinds of sensors 31, 32, 33, and 34 are mounted on one surface thereof. The body member 10 has a rectangular plate shape and has a structure in which a lower block DB and an upper block UB, which protrude from the surface of the body member 10, on which the sensors 31, 32, 33, and 34 are mounted, are provided.

The lower block DB refers to a portion that is placed at a lower side, and the upper block UB refers to a portion that is placed at an upper side when the body member 10 is mounted on a case 20.

Figure 4:
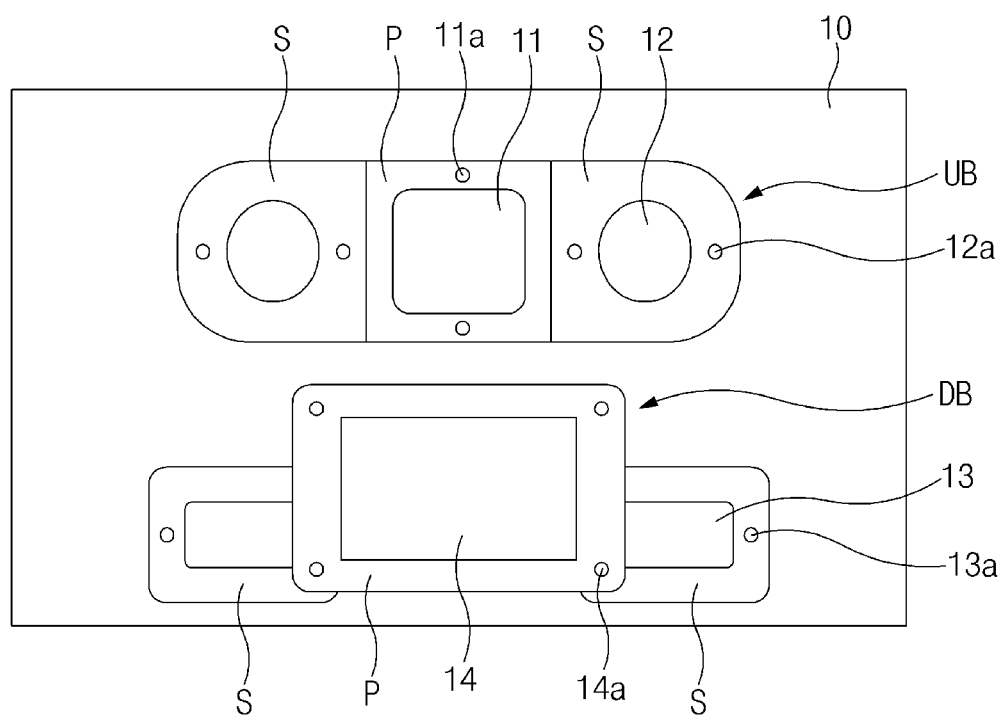
FIG. 4 is a front view illustrating a front side of a body member in accordance with an exemplary embodiment of the present invention.

In the present invention, each of the lower block DB and the upper block UB has three flat surfaces on which the sensors 31, 32, 33, and 34 are installed. In more detail, as illustrated in FIG. 4, which illustrates a front side of the body member of the present invention, each of the upper block UB and the lower block DB has a plane P defined at its center, which is parallel to the surface of the body member 10 and inclined surfaces S, which are respectively defined at both sides of the plane P.

That is, each of the upper block UB and the lower block DB has a structure in which the central plane P protrudes at the highest height, and the inclined surfaces S are inclined so that sides of the inclined surfaces S, which are adjacent to the plane P, further protrude. Also, the upper block UB and the lower block DB may have different protruding degrees and areas of the planes P and the inclined surfaces S. This may vary depending on sizes of the corresponding sensors 31, 32, 33, and 34 to be installed.

In the present invention, the plane P defined on the lower block DB has an area greater than that of the plane P defined on the upper block UB and protrudes further than the plane P defined on the upper block UB. Furthermore, in the planes P and the inclined surfaces S, which are defined in the upper block UB and the lower block DB, mounting grooves 11, 12, 13, and 14 are defined so that ends of the sensors 31, 32, 33, and 34 are inserted, and screw grooves 11a, 12a, 13a, and 14a into which coupling bolts B (see FIG. 2) are screw-coupled are defined in the vicinity of the mounting grooves 11, 12, 13, and 14, respectively.

The planes P and the inclined surfaces S, which are defined on the upper block UB and the lower block DB, and the mounting grooves 11, 12, 13, and 14 and the screw grooves 11a, 12a, 13a, and 14a are determined in shape in accordance with sizes of the sensors 31, 32, 33, and 34 to be mounted.

Furthermore, an opposite surface of the body member 10 is provided as a whole plane. As illustrated in FIG. 3, additional screw grooves may be punched, in size and number, such that a cooling device 40 and a position control device 50 (to be described later), are capable of being coupled to each other, and wires connected to the mounted sensors 31, 32, 33, and 34 and electronic components may be additionally mounted.

Also, the sensor-cluster apparatus of the present invention includes a case in which the body member 10 is mounted.

The case 20 has an inner space that is sufficient so that the body member 10 is capable of being mounted and moving within a predetermined range. Also, the case 20 has a structure of which one side is opened to define an opening (a portion through which the inside and the outside of the case communicate with each other).

The case 20 has a structure in which each of a rear side of the opening and both side surfaces thereof has a rectangular shape, and each of top and bottom surfaces has a rectangular shape of which a central portion is rounded to convexly protrude along an edge in which the opening defined, with reference to FIG. 2. Thus, the opening has a curved shape in the case 20.

Figure 5A:
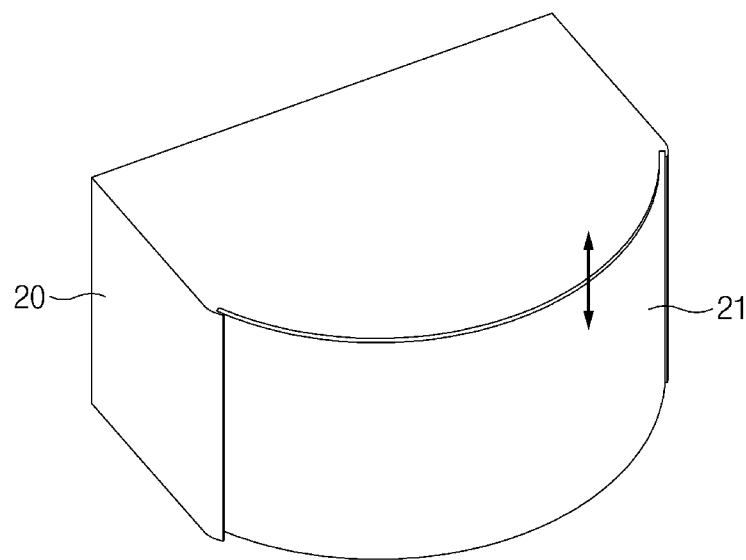
FIGS. 5A and 5B are perspective views respectively illustrating a closed state (upper picture) and an opened state (a lower picture) of the cover by coupling the cover to the case.
Figure 5B:
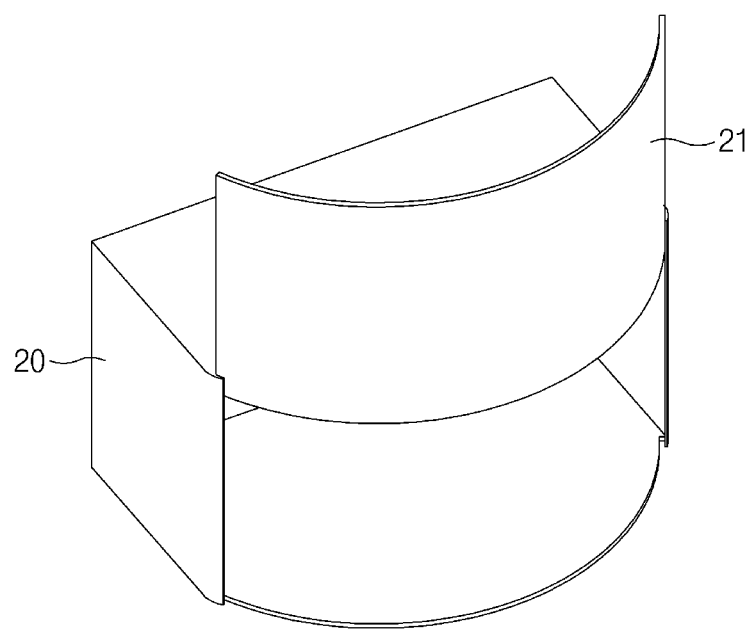

Also, a cover 21 is coupled to the case 20 to cover the opening. As illustrated in FIGS. 5A and 5B, which respectively illustrate a closed state and an opened state of the cover 21 by coupling the cover to the case 20, when the cover 21 is slid vertically on the case 20 so as to be opened and closed. As a result, the cover 21 may be closed to prevent water, dust, and other foreign matter, etc. from being introduced into the case 20, and may be opened so that the sensors 31, 32, 33, and 34 and the body member 10 are detached. Also, the cover 21 may be selectively opened in accordance with determination of the control device, such as a case in which foreign matter is attached to the front surface of the cover 21, to cause a sensing error.

The cover 21 is manufactured by using a material having high transmittance so that infrared rays, visible light, optical pulses (laser), and electromagnetic waves, which are sensed by the mounted sensors 31, 32, 33, and 34, are sensed without distortion and having an appropriate strength and durability.

The vertical sliding of the cover 21 may be performed by a sliding device 60 mounted inside or outside the case 20.

Figure 6:
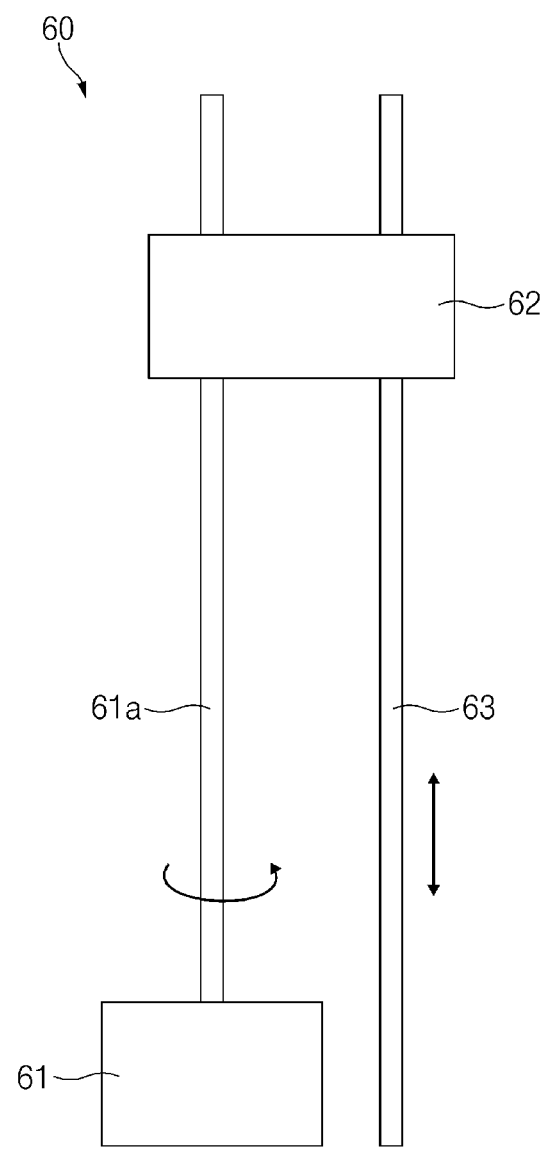
FIG. 6 is a simplified view of a sliding device in accordance with the an exemplary embodiment of present invention.

As illustrated in FIG. 6, the sliding device in accordance with the present invention includes a motor 61 for axially rotating a rotation shaft 61a, a gear assembly 62 for converting the rotation movement of the rotation shaft 61a into sliding movement, and a slidable part 63 coupled to the cover 21 so as to be slid by the gear assembly 62.

Also, the motor 61 is controlled by a controller (not shown) that supplies power to control an operation of the motor 61, and the controller is interlocked with a controller communicating with the sensors 31, 32, 33, and 34.

Figure 7C:
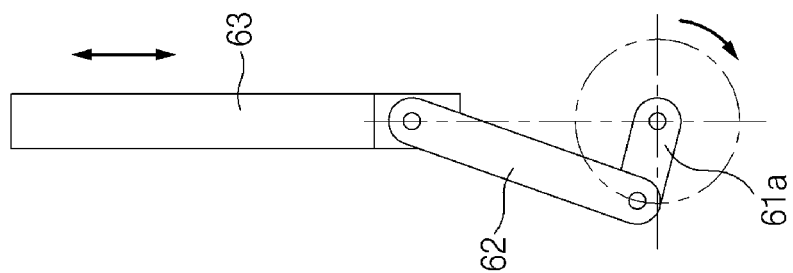
FIG. 7C is a view of a link work, which are included in a gear assembly in accordance with an exemplary embodiment of the present invention.
Figure 7B:
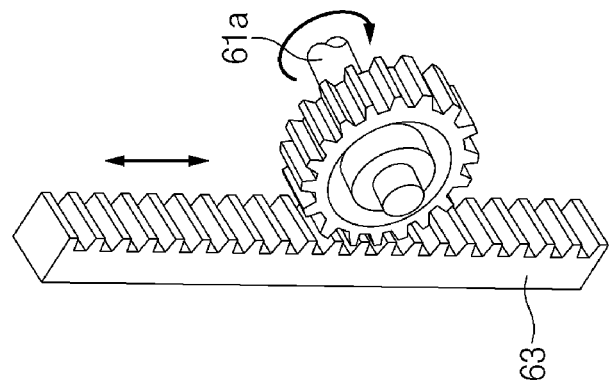
FIG. 7B is a view of a rack and a pinion.
Figure 7A:
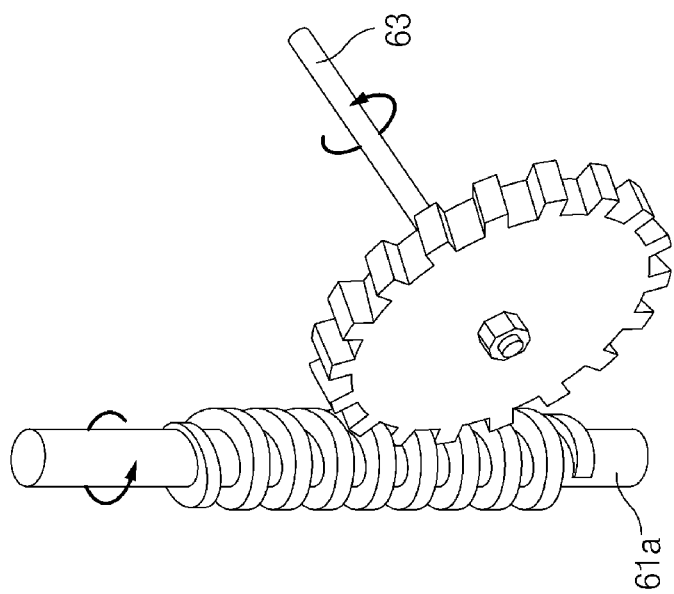
FIG. 7A is a view of a worm and a worm wheel.

In the present invention, a structure that is capable of converting the rotation movement into the sliding movement may be applied to the gear assembly 62. That is, as illustrated in FIGS. 7A-7C, the rotation shaft 61a of the motor is connected to a worm, and the gear assembly 62 may include a worm wheel engaged with the worm. In FIG. 7A, the worm wheel may receive rotational force from the worm connected to the motor to allow the slidable part 63 to be slid through the other worm (not shown). Also, as illustrated in FIG. 7B, the rotation shaft 61a of the motor may be connected to a pinion, and the gear assembly 62 may include a rack so that sliding movement of the rack is transmitted to the slidable part 63. As illustrated in FIG. 7C, when the rotation shaft 61a of the motor rotates a driving shaft of a link work, the rotation movement may be converted into the sliding movement in a driven shaft.

In the present invention, the sensors mounted on the body member include a camera sensor 31, an infrared sensor 32, a lidar sensor 33, and a radar sensor 34.

The camera sensor 31 is disposed within the case 20 so that a lens faces the opening and is configured to recognize an object in a visible region. The camera sensor 31 may include at least one lens to provide a three-dimensional image. Also, when the vehicle is driven, the camera sensor 31 may provide information for identifying traffic signs, detecting blind spots, and recognizing lane departure, pedestrians, and front objects.

The infrared sensor 32 is also disposed within the case 20 so that a lens faces the opening and is configured to recognize an object in an infrared region. The infrared sensor 32 may convert infrared rays, which are emitted from an object, into an electrical signal to provide image information. In particular, the infrared sensor 32 may provide information for recognizing objects and pedestrians in front of and around the vehicle when driven at night.

The radar sensor 34 is disposed within the case so that a portion of the radar sensor 34, at which electromagnetic waves are generated, faces the opening. The radar sensor 34 emits the electromagnetic waves to the front of the case 20 to grasp a direction, a distance, a speed, etc., of an object through the reflected carrier signal. The electromagnetic waves emitted from the radar sensor 34 may not distinguish weather and day and night, and thus, may provide information by supplementing the camera sensor 31.

The lidar sensor 33 recognizes an object in a manner that is similar to that of the radar sensor 34, but acquires distance information using an optical pulse (laser) rather than from the electromagnetic waves. That is, the lidar sensor 33 is also disposed within the case 20 so that a portion of the lidar sensor 33, from which the optical pulse is emitted, faces the opening. The lidar sensor 33 emits the optical pulse to the front of the case 20 to detect an object through a reflected carrier signal, thereby mapping the distance.

Also, as illustrated in FIG. 2, one radar sensor 34, one camera sensor 31, two infrared sensors 32, and two lidar sensors 33 are mounted on the body member 10.

Here, the radar sensor 34 and the camera sensor 31 are disposed at the center (i.e., the planes of the upper block and the lower block) of the body member 10. Here, the camera sensor 31 is disposed above the radar sensor 34. Also, the lidar sensors 33 and the infrared sensors 32 are respectively disposed at both sides of the body member 10 with the camera sensor 31 and the radar sensor 34 therebetween. Here, the infrared sensors 32 are disposed above the lidar sensors 33.

That is, the radar sensor 34 having a relatively narrow elevation angle (a sensible angle in a height direction of the vehicle) and a relatively wide azimuth angle (a sensible angle in a width direction of the vehicle) is disposed below the center, and the camera sensor 31 is disposed above (above the center) the radar sensor 34. The lidar sensors 33 are disposed at both sides of the radar sensor 34, respectively, and the infrared sensors 32 are disposed at both sides of the camera sensor 31, respectively.

Since each of the lidar sensors 33 has a relatively wide elevation angle and a relatively narrow azimuth angle when compared to those of the radar sensor 34, the two lidar sensors 33 are provided. Also, each of the infrared sensors 32 has a relatively wide elevation angle like the camera sensor 31, but the two infrared sensors 32 are provided in consideration of a space and symmetry. However, only one lidar sensor 33 may be mounted as long as the azimuth angle is sufficient.

Also, in the present invention, each of the infrared sensor 32, the camera sensor 31, the lidar sensor 33, and the radar sensor 34 is detachably coupled to the body member 10. That is, when one of the sensors 31, 32, 33, 34 needs to be replaced, only the corresponding sensor may be detached from the body member 10 without detaching the body member 10 from the case 20.

In the present invention, a position control device 50 mounted inside the case 20 to adjust a mounting position or a mounting angle of the body member 10 is provided.

When each of the infrared sensor 32, the camera sensor 31, the lidar sensor 33, and the radar sensor 34 is misaligned in angle or position, each of the infrared sensor 32, the camera sensor 31, the lidar sensor 33, and the radar sensor 34 may have a function of correcting the misaligned angle or position by itself. However, when the misaligned angle or position is above a certain reference value (for example, the misaligned angle is about 3 degrees), it is impossible to correct the misaligned angle or position through the self-correction function. Therefore, when the sensors 31, 32, 33, and 34 are misaligned in position or angle by an external impact or the like, the position control device 50 provides a function of correcting the misaligned position or angle.

Figure 8:
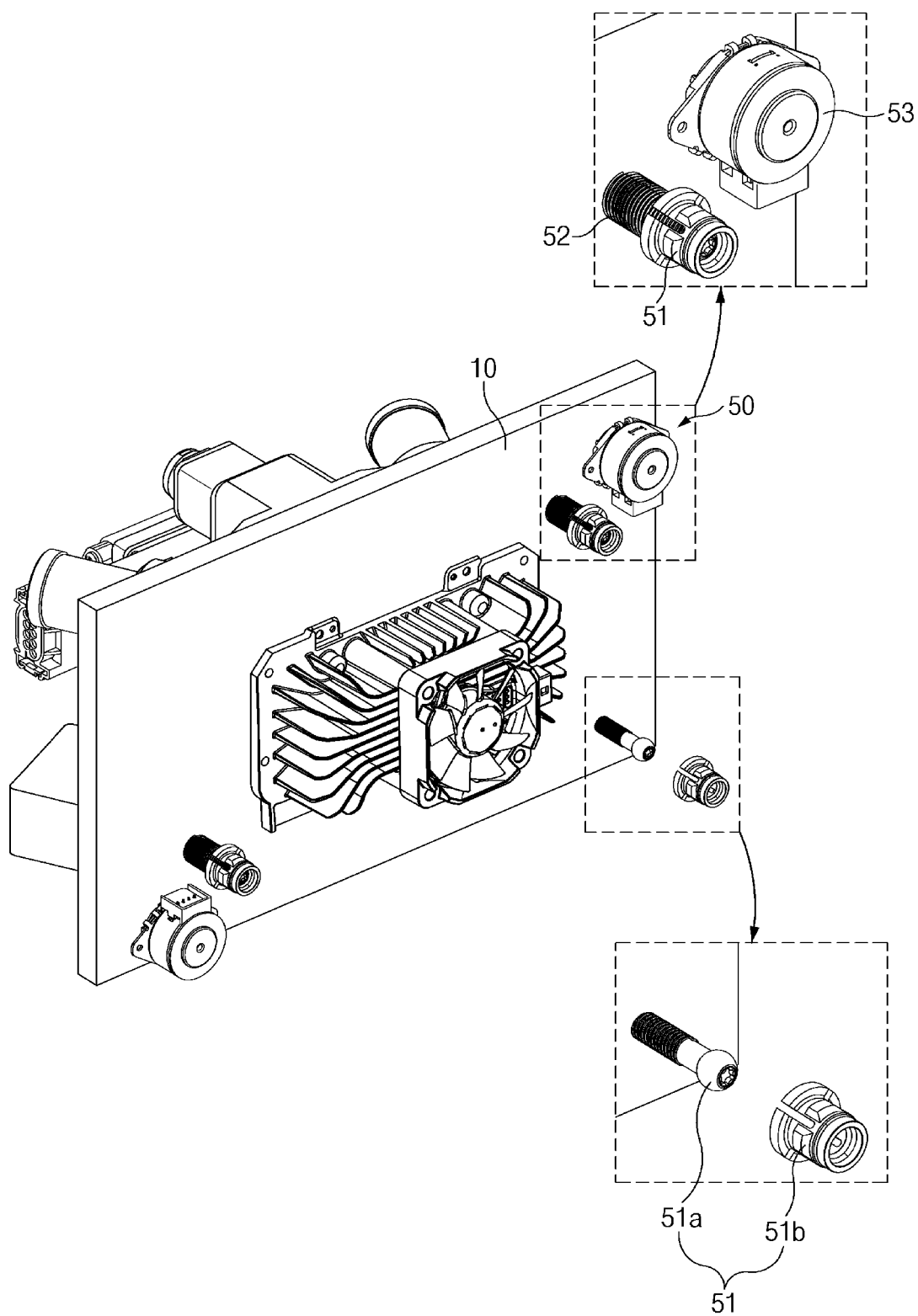
FIG. 8 is an enlarged perspective view of a position control device in accordance with an exemplary embodiment of the present invention.

As illustrated in FIG. 8, the position control device 50 in accordance with the present invention includes a ball joint 51, a tension spring 52, and an actuator 53.

A ball stud 51a having a ball at an end thereof and a casing stud 51b having a casing, which accommodates the ball and allows the ball stud 51a to be freely rotated, at an end thereof are coupled to each other to provide the ball joint 51. In the present invention, an end (an opposite side of the end at which the ball is disposed) of the ball stud 51a is fixed to the body member 10, and an end (an opposite to the end at which the casing is disposed) of the casing stud 51b is fixed to the inside of the case 20.

The tension spring 52 has one end connected to the case 20 and the other end connected to the body member 10. Here, in order to minimize a mounting space, the tension spring 52 is mounted between the ball stud 51a and the casing stud 51b to provide elastic force between the body member 10 and the case 20 (the end of the tension spring is connected to the body member, and the other end of the tension spring is connected to the casing stud fixed to the case so that the tension spring resists force moving in a direction away from the case). That is, the tension spring 52 provide elastic force that resists a tensile load (that occurs when the body member is away from the case).

The actuator 53 is fixedly mounted inside the case 20 to provide force for pushing (pressing) the body member 10. That is, the actuator 53 overcomes the elastic force of the tension spring 52 to push the body member 10, thereby correcting distortion of the body member 10.

Therefore, the mounting position and the mounting angle of the body member 10 are maintained by the tension spring 52. However, when the actuator 53 presses the body member 10, the actuator 53 overcomes the elastic force of the tension spring 52, and thus, the mounting position or the mounting angle of the body member 10 may be changed. That is, the mounting position and angle may be calibrated.

As illustrated in FIG. 8, in the present invention, the ball joint 51, the tension spring 52, and the actuator 53 are mounted on a surface of the body member 10, which is opposite to the surface on which the sensors 31, 32, 33, and 34 are mounted. However, portions of the ball joint 51, the tension spring 52, and the actuator 53 may be mounted on the surface on which the sensors 31, 32, 33, and 34 are mounted, such that interference with each of the sensors 31, 32, 33, and 34 is not possible.

Furthermore, the actuator 53 may operate through a hydraulic device, a pneumatic device, or another power supply device. However, in the present invention, the actuator 53 operates by driving an electromagnet or a motor through the supply of current so as to enable precise position control.

Figure 9:
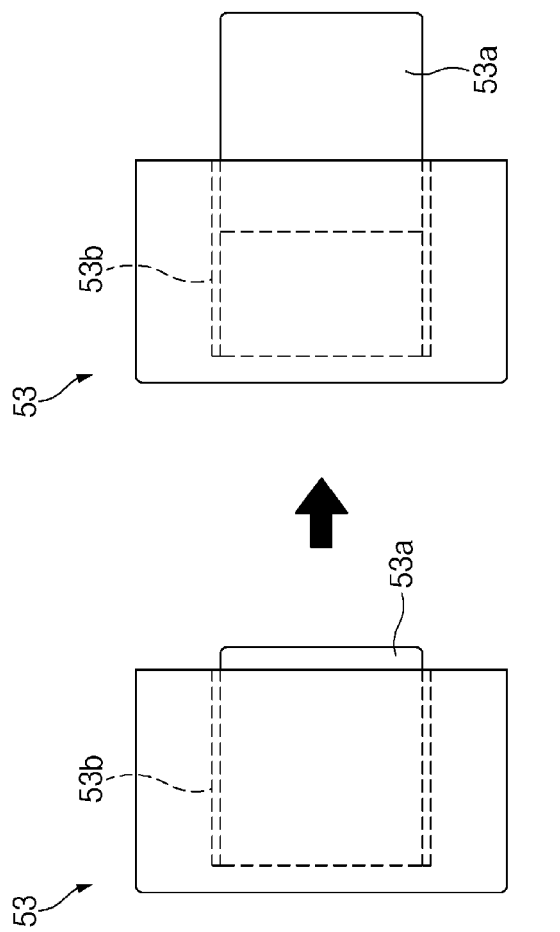
FIG. 9 is a cross-sectional view of an actuator.

That is, as illustrated in FIG. 9, the actuator 53 includes a cylinder 53*b* having a hollow cylindrical shape and a piston 53*a* slidably mounted inside the cylinder 53*b* and disposed so that an end of the piston presses the body member 10. The piston 53*a* may be configured to be slid through the device such as the motor or the electromagnet, which is rotatable forward and reverse. That is, the piston 53*a* may be slid through the link work that converts the rotation force of the motor into the sliding movement or may be slid using the electromagnet.

Since the body member 10 is pushed by the piston 53*a* at a different spaced point while a portion of the body member 10 is fixed to the case 20, the misaligned angle may be adjusted in accordance with a protruding degree of piston 53*a*.

In the present invention, the ball joint 51, the tension spring 52, and the actuator 53 form one adjustment set. Here, at least two or more adjustment sets are installed at positions that are spaced apart from each other, respectively.

That is, as illustrated in FIG. 8, the body member 10 has a rectangular plate shape having four vertices. Thus, the adjustment set is disposed in the vicinity of two vertices which are diagonally connected to each other in the body member, respectively.

As described above, since the adjustment sets are disposed in paths provided by the diagonal lines in the body member, the misalignment in various directions and the fine misalignment may be corrected by the two adjustment sets. That is, in the two adjustment sets, the protruding degree of the piston 53*a* may be adjusted to perform the fine correction.

Also, the ball joint 51 and the tension spring 52 may be additionally installed in the body member 10 and the case 20 in addition to the ball joint 51 and the tension spring 52, which are provided in the adjustment set, respectively.

Here, the ball joint 51 and the tension spring 52 that are additionally installed in addition to the ball joint 51 and the tension spring 52, which are provided in the adjustment set, may be installed in the vicinity of one of remaining two vertices except for the two vertices at which the adjustment set is disposed in the body member 10.

Since the present invention having the configuration as described above has the structure in which the plurality of sensors 31, 32, 33, and 34 are mounted on the body member at once and built in the case 20, even if one or some of the sensors 31, 32, 33, and 34 fail, other sensors may provide data to compensate or supplement the data of the failed sensors. Also, since the sensors 31, 32, 33, and 34 are mounted in one place within the case 20, integrated maintenance and mounting of the sensors 31, 32, 33, and 34 may be easily performed.

Since the sensor-cluster apparatus according to the present invention includes the position control device 50, the body member may be adjustable in mounting position or mounting angle. That is, the sensor may easily return to its original position or be adjusted in arrangement angle toward the required direction in accordance with the driving condition of the vehicle or when the repositioning of the sensor is required by the external impact.

Since the position control device 50 according to the present invention is capable of adjusting the position and angle of the body member only by the elastic force of the tension spring and the pushing force of the actuator in the state of being coupled to the ball joint that allows the body member to be freely rotated in the case, the position control device may be simplified in configuration to reduce a failure rate and be miniaturized to be easily mounted.

According to the present invention, the ball joint 51, the tension spring 52, and the actuator 53 constitute one adjustment set, and at least two or more adjustment sets may be spaced apart from each other to adjust the body member to more various postures or positions.

In accordance with the present invention, one radar sensor 34, one camera sensor 31, two infrared sensors 32, and two lidar sensors 33 are mounted on the body member. Here, the two infrared sensors may have a sensing range overlapping each other (or, the two lidar sensors may also have a sensing range overlapping each other). Therefore, when the failure of one sensor occurs, the position control device 50 in accordance with the present invention may be configured to periodically change the mounting angle of the body member 10 so that the remaining sensors cover a sensing range of the failed sensor.

Also, each of the infrared sensor 32, the camera sensor 31, the lidar sensor 33, and the radar sensor 34 may be detachably coupled to the body member 10. That is, when one sensor needs to be replaced, only the corresponding sensor may be detached from the body member without detaching the body member from the case.

The cover in accordance with the present invention may prevent water, dust, and other foreign matter from being permeated into the case. In addition, the cover may be made of the material that transmits the infrared rays, the visible light, the optical pulses, and the electromagnetic waves, which are transmitted and received by each of the sensors, to prevent the sensing performance from being deteriorated and may be opened and closed by the sliding device as necessary.

Since the present invention having the configuration as described above has the structure in which the plurality of sensors are mounted on the body member at once and built in the case, even if one or some of the sensors fail, other sensors may provide the data to compensate or supplement the data of the failed sensors. Also, since the sensors are mounted in one place within the case, the integrated maintenance and mounting of the sensors may be easily performed.

Since the sensor-cluster apparatus in accordance with the present invention includes the position control device, the body member may be adjustable in mounting position or mounting angle. That is, the sensor may easily return to its original position or be adjusted in arrangement angle toward the required direction in accordance with the driving condition of the vehicle or when the repositioning of the sensor is required by the external impact.

Since the position control device in accordance with the present invention is capable of adjusting the position and angle of the body member only by the elastic force of the tension spring and the pushing force of the actuator in the state of being coupled to the ball joint that allows the body member to be freely rotated in the case, the position control device may be simplified in configuration to reduce the failure rate and be miniaturized to be easily mounted.

In accordance with the present invention, the ball joint, the tension spring, and the actuator constitute one adjustment set, and at least two or more adjustment sets may be spaced apart from each other to adjust the body member to more various postures or positions.

In accordance with the present invention, the one radar sensor, the one camera sensor, the two infrared sensors, and the two lidar sensors may be mounted on the body member. Here, the two infrared sensors may have the sensing range overlapping each other (or, the two lidar sensors may also have the sensing range overlapping each other). Therefore, when the failure of one sensor occurs, the position control device in accordance with the present invention may be configured to periodically change the mounting angle of the body member so that the remaining sensors cover the sensing range of the failed sensor.

Also, each of the infrared sensor, the camera sensor, the lidar sensor, and the radar sensor may be detachably coupled to the body member. That is, when one sensor needs to be replaced, only the corresponding sensor may be detached from the body member without detaching the body member from the case.

The cover in accordance with the present invention may prevent water, dust, and other foreign matter from being permeated into the case. In addition, the cover may be made of the material that transmits the infrared rays, the visible light, the optical pulses, and the electromagnetic waves, which are transmitted and received by each of the sensors, to prevent the sensing performance from being deteriorated and may be opened and closed by the sliding device as necessary.

While the embodiments of the present invention have been described with reference to the specific embodiments, it will be apparent to those skilled in the art that various changes and modifications may be made without departing from the spirit and scope of the invention as defined in the following claims.

What is claimed is:

1. A sensor-cluster apparatus including a plurality of sensors configured to detect and collect external environment information mounted in a case, the sensor-cluster apparatus comprising:
   a body member on which a plurality of different kinds of sensors are mounted on one surface thereof;
   a case having an inner space, and one surface thereof is opened to define an opening and on which the body member is mounted so that each of the sensors is exposed to the opening;
   a position control device mounted inside the case to and configured to adjust a mounting position or a mounting angle of the body member; and
   a cover coupled to the case to cover the opening,
   wherein:
   the cover opens and closes the opening by a sliding device; and
   the sliding device comprises:
      a motor configured to axially rotate a rotation shaft;
      a gear assembly configured to convert rotation movement of the rotation shaft into sliding movement; and
      a slidable part coupled to the cover so as to be slid by the gear assembly.

2. The sensor-cluster apparatus of claim 1, wherein the position control device comprises:
   a ball joint in which a ball stud having a ball at an end thereof and a casing stud having a casing, which accommodates the ball and allows the ball stud to be freely rotated, at an end thereof are coupled to each other;
   a tension spring having one end connected to the case and the other end connected to the body member to provide elastic force that resists a tensile load; and
   an actuator configured to press the body member within the case,
   wherein:
   one of the ball stud and the casing stud is fixed to the body member, and the other is fixed to the case;
   a mounting position and a mounting angle of the body member are maintained by the tension spring; and
   when the actuator presses the body member, the actuator overcomes the elastic force of the tension spring, and the mounting position and the mounting angle of the body member are changed.

3. The sensor-cluster apparatus of claim 2, wherein the ball joint, the tension spring, and the actuator are mounted on a surface of the body member, which is opposite to the surface on which the sensors are mounted.

4. The sensor-cluster apparatus of claim 3, wherein the actuator comprises:
   a cylinder having a hollow cylindrical shape; and
   a piston slidably mounted inside the cylinder and disposed so that an end of the piston presses the body member.

5. The sensor-cluster apparatus of claim 3, wherein:
   the ball joint, the tension spring, and the actuator form one adjustment set; and
   at least two or more adjustment sets are installed at positions that are spaced apart from each other, respectively.

6. The sensor-cluster apparatus of claim 5, wherein:
   the body member has a rectangular plate shape having four vertices; and
   the adjustment set is disposed in the vicinity of two vertices which are diagonally connected to each other in the body member, respectively.

7. The sensor-cluster apparatus of claim 6, wherein the ball joint and the tension spring are additionally installed in the body member and the case in addition to the ball joint and the tension spring, which are provided in the adjustment set, respectively.

8. The sensor-cluster apparatus of claim 7, wherein the ball joint and the tension spring that are additionally installed in addition to the ball joint and the tension spring, which are provided in the adjustment set, are installed in the vicinity of one of remaining two vertices except for the two vertices at which the adjustment set is disposed in the body member.

9. The sensor-cluster apparatus of claim 2, wherein the plurality of kinds of sensors comprise:
   a camera sensor disposed within the case to face the opening, the camera sensor being configured to recognize an object in a visible light wavelength region;
   an infrared sensor disposed within the case to face the opening, the infrared sensor being configured to recognize an object in an infrared light wavelength region;
   a lidar sensor disposed within the case to face the opening, the lidar sensor being configured to emit an optical pulse and detect an object through a reflected carrier signal, thereby mapping a distance; and
   a radar sensor disposed within the case to face the opening, the radar sensor being configured to emit electromagnetic waves and detect an object through a reflected carrier signal, thereby mapping a distance.

10. The sensor-cluster apparatus of claim 9, wherein:
one radar sensor, one camera sensor, two infrared sensors, and two lidar sensors are mounted on the body member;
the radar sensor and the camera sensor are disposed at a center of the body member, the camera sensor being disposed above the radar sensor; and
the lidar sensors and the infrared sensors are respectively disposed at both sides of the body member with the camera sensor and the radar sensor therebetween, the infrared sensors being disposed above the lidar sensors.

11. The sensor-cluster apparatus of claim 10, wherein each of the infrared sensor, the camera sensor, the lidar sensor, and the radar sensor is detachably coupled to the body member.

12. The sensor-cluster apparatus of claim 1, wherein the cover is made of a material through which infrared rays, visible light, optical pulses, and electromagnetic waves are transmittable.

\* \* \* \* \*